US009321660B2

(12) United States Patent
Strain

(10) Patent No.: US 9,321,660 B2
(45) Date of Patent: Apr. 26, 2016

(54) SYSTEM INCLUDING A WATER TREATMENT TANK AND A DEVICE FOR INTERFERING WITH THE REMOVAL OF A RISER TUBE FROM THE WATER TREATMENT TANK

(71) Applicant: 1720618 ONTARIO INC., Barrie (CA)

(72) Inventor: Peter Strain, Shanty Bay (CA)

(73) Assignee: 1720618 Ontario Inc., Barrie, Ontario (CA)

( * ) Notice: Subject to any disclaimer, the term of this patent is extended or adjusted under 35 U.S.C. 154(b) by 213 days.

(21) Appl. No.: 14/166,804

(22) Filed: Jan. 28, 2014

(65) Prior Publication Data

US 2014/0217000 A1  Aug. 7, 2014

Related U.S. Application Data

(60) Provisional application No. 61/761,210, filed on Feb. 5, 2013.

(51) Int. Cl.

| | | |
|---|---|---|
| C02F 1/42 | (2006.01) |
| F16L 3/127 | (2006.01) |
| B01D 24/14 | (2006.01) |
| F16L 3/12 | (2006.01) |

(52) U.S. Cl.
CPC . *C02F 1/42* (2013.01); *B01D 24/14* (2013.01); *C02F 2201/004* (2013.01); *C02F 2303/14* (2013.01); *F16L 3/127* (2013.01); *F16L 3/1211* (2013.01)

(58) Field of Classification Search
CPC .... B01D 24/14; B01D 24/165; B01D 24/186; C02F 1/42; C02F 2201/004; C02F 2303/14; F16L 3/1211; F16L 3/127
USPC .................... 210/288; 138/106; 248/52, 74.4
See application file for complete search history.

(56) References Cited

U.S. PATENT DOCUMENTS

| | | | | |
|---|---|---|---|---|
| 1,833,187 A | * | 11/1931 | Stringer | ............... F16L 5/02 248/56 |
| 6,123,154 A | * | 9/2000 | MacDonald, III | ..... A62C 35/68 169/16 |

* cited by examiner

*Primary Examiner* — Matthew O Savage
(74) *Attorney, Agent, or Firm* — Gilbert'LLP; Matthew Powell

(57) ABSTRACT

A device for interfering with removal of a riser tube from within a water treatment tank. The device includes a collar having a central region dimensioned to fixedly receive the riser tube; and at least one restraining arm extending from the collar away from the central region, wherein the at least one restraining arm is dimensioned to contact an inner wall of the water treatment tank when the riser tube is moved upwards with respect to the treatment tank thereby interfering with removal of the riser tube from the water treatment tank.

6 Claims, 7 Drawing Sheets

SYSTEM INCLUDING A WATER TREATMENT TANK AND A DEVICE FOR INTERFERING WITH THE REMOVAL OF A RISER TUBE FROM THE WATER TREATMENT TANK

CROSS REFERENCE TO RELATED APPLICATION

This application claims priority under 35 U.S.C. 119(e) from U.S. Provisional Patent Application Ser. No. 61/761,210 filed on Feb. 5, 2013.

FIELD OF THE INVENTION

The present invention relates generally to water treatment and in particular to a device for interfering with removal of a riser tube from a water treatment tank.

BACKGROUND OF THE INVENTION

Water softening systems, iron filters and back washing filters are examples of water treatment systems. Water softening systems, for example, have long been used to soften water by removing magnesium, calcium and other metal cations from hard water. The softened water is typically more suitable than hard water for allowing soaps and detergents to efficiently clean. Furthermore, softened water causes far less lime scale build up within water pipes than hard water, allowing the water pipes to remain substantially free of such blockages so water can freely flow.

Water softening systems are often positioned near to where water enters a home, office, or industrial building from an external source, such as a well or municipal water distribution system, so that the water can be softened prior to its further distribution and use. Such systems typically comprise a water treatment tank storing water softening media, a brine source for periodically regenerating the softening media, and a control system (such as a water softener valve in the case of a water softener system or other control system for removing iron, for example) switching between a service mode and a regeneration mode.

Typically, a riser tube extends inside the water treatment tank generally from the top of the water treatment tank to its bottom. The riser tube extends from a port, or inlet, in the control system that is mounted atop the water treatment tank, through the water softening media, to terminate near to the bottom of the water treatment tank. A basket at the bottom of the riser tube keeps water softening media from entering into the riser tube and blocking the riser tube. The riser tube conveys treated water from within the water treatment tank to the control system for use outside of the water softener system.

After prolonged use of the water treatment system, it is common for the control system inlet and the riser tube to become adhered to each other at their interface due to the effects of water, water contaminants and the ion-exchange resin. During servicing or maintenance, when it is desired to remove the control system mounted atop of the water treatment tank, it is common though undesirable for the riser tube to be pulled upwards and partially out of the water treatment tank along with the control system, due to the adherence. It is difficult to know whether such adherence has occurred until the control system has been removed enough for a tool or hand to enter the space between the control system and the top of the water treatment tank to grip the riser tube and prevent it further rising. By the time there is space enough to grip the riser tube, the riser tube, if so-adhered to the control system, has already risen partly out of the tank. This can cause frustration for maintenance personnel because once the riser tube has been pulled upwards in this manner, the water softening media backfills the space and blocks the riser tube from being re-settled to its desired position. As a result, the maintenance personnel must remove all or most of the water softening media, reset the position of the riser tube, and then pour the water softening media into place in the water treatment tank. This is a very time-consuming task.

SUMMARY OF THE INVENTION

The invention relates to a device for impeding removal of a riser tube in a water treatment system, and to a water treatment system incorporating the device.

According to an aspect, there is provided a device for interfering with removal of a riser tube from within a water treatment tank, the device comprising a collar having a central region dimensioned to fixedly receive the riser tube; and at least one restraining arm extending from the collar away from the central region, wherein the at least one restraining arm is dimensioned to contact an inner wall of the water treatment tank when the riser tube is moved upwards with respect to the treatment tank thereby interfering with removal of the riser tube from the water treatment tank.

Sufficient interference with removal of the riser tube from the water treatment tank occurs if the riser tube is kept from rising until the control system and the riser tube are disconnected. The collar's fixed reception of the riser tube must be at least slightly greater than the force adherence of the riser tube to the control system, or the collar will simply slide along the riser tube while the riser tube is pulled upwards.

BRIEF DESCRIPTION OF THE DRAWING

Embodiments of the invention will now be described with reference to the appended drawings in which.

DETAILED DESCRIPTION

Figure 1:
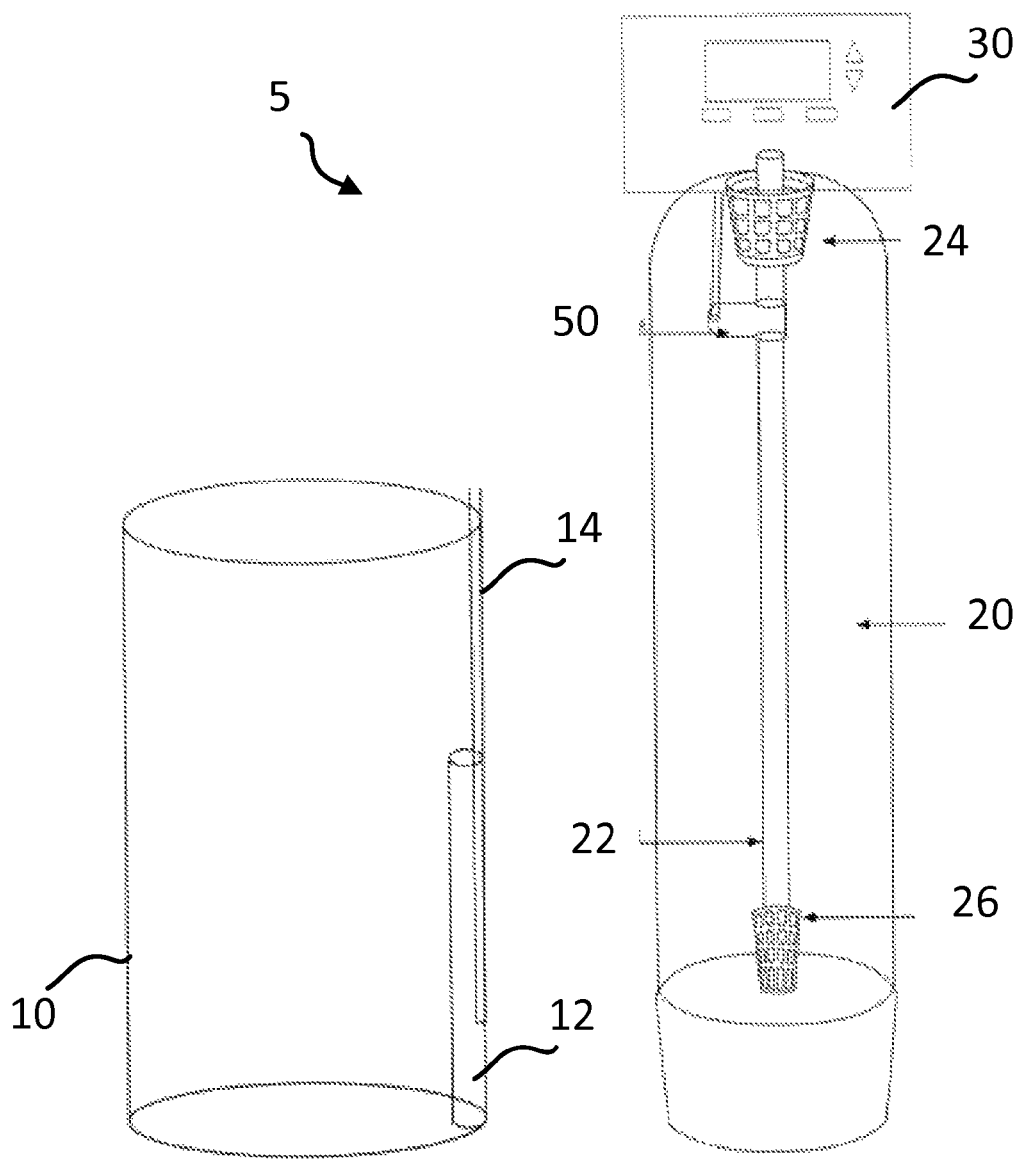
FIG. 1 is a schematic diagram of components of a water treatment system incorporating a device for interfering with removal of a riser tube, according to an embodiment.

FIG. 1 is a schematic diagram of components of a water treatment system 5 incorporating a device 50 for interfering with removal of a riser tube 22 from a water treatment tank 20, according to an embodiment. In this embodiment, water treatment system 5 is a water softening system. The water treatment system 5 generally includes a salt brine tank 10, the water treatment tank 20, a water softener valve 30, and the device 50.

In this embodiment, the salt brine tank 10 serves as a source of regenerating fluid. The fluid in this embodiment is brine—a solution of sodium chloride and water. The salt brine tank 10 stores sodium chloride salt into which water may be introduced in order to produce the brine. A float tube 12 and a float (not shown) are positioned within the salt brine tank 10, and partly inserted within float tube 12 is a brine tube 14 for conveying source water for forming brine to salt brine tank 10 and for also conveying the formed brine away from salt brine tank 10, during regeneration. FIG. 1 is not intended to show interconnections between various components for conveying fluids, but to illustrate positioning of device 50 in the context of a water treatment system 5 as a whole. Further details regarding operation of water treatment systems with which the device 50 may be used can be found in the disclosures of U.S. patent application Ser. No. 14/104,496 and U.S. patent application Ser. No. 14/109,035, the contents of each of which are incorporated by reference herein.

The water treatment tank 20 stores water softening media which, in this embodiment, is a cation softener media mixture of fine and coarse particles. The water treatment tank 20 further includes riser tube 22 through which treated water is conveyed into the water softener valve 30 for subsequent use outside of the water softener system 5. An upper basket 24 and a lower basket 26 are associated with the riser tube 22, as would be understood.

Figure 2:
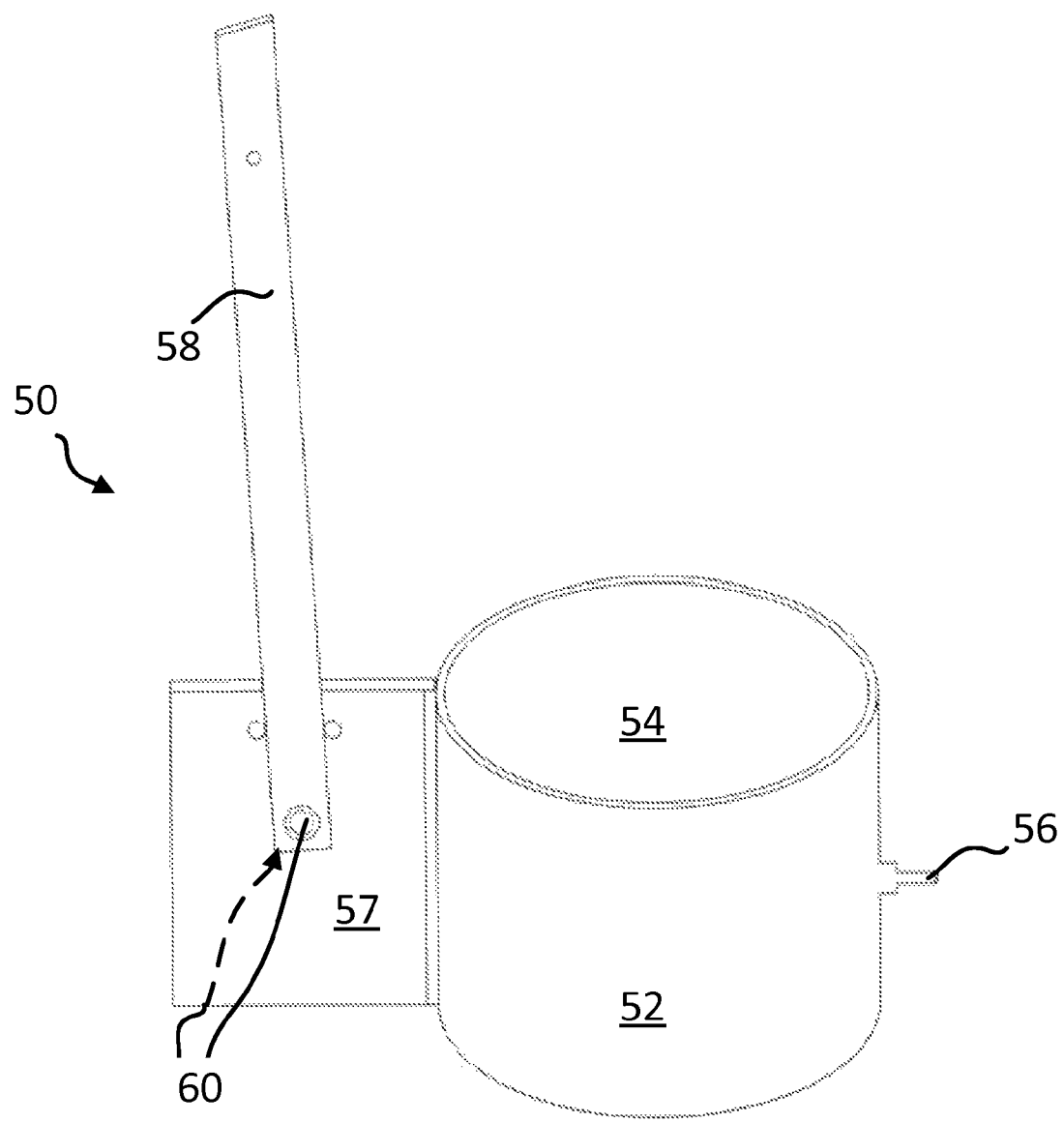
FIG. 2 is a perspective front view of the device for interfering with removal of a riser tube, in isolation.

FIG. 2 is a perspective front view of the device 50, in isolation. Device 50 includes a collar 52 having a central region 54 dimensioned to fixedly receive the riser tube 22. In this embodiment, a set screw 56 threaded through the collar 52 acts as a tightening mechanism for tightening the collar 52 against the riser tube 22. Other tightening mechanisms, such as a clamp, may be used alternatives to a set screw. The strength of the connection reached through the tightening should ensure that any adherence between the riser tube 22 and the water softener valve 30 with which it is normally in fluid communication for operation of the water treatment system 5 can be overcome when the water softener valve 30 is being removed, before the collar 52 can slide with respect to the riser tube 22, with a view to keeping riser tube 22 from being pulled along with the water softener valve 30 due to the collar 52 merely sliding down the riser tube 22.

Alternatively, while not tested, it may be possible for the collar to receive the riser tube in a friction fit without use of a tightening mechanism.

The device 50 also includes a restraining arm 58 extending from a plate 57 that itself is extending from the collar 52 away from the central region 54. The restraining arm 58 is dimensioned in length to contact an inner wall of the water treatment tank 20. Should the riser tube 22 be pulled upwards upon removal of the water treatment valve 30 with respect to the water treatment tank 20, the restraining arm 58 contacts the water treatment tank 20 and due to its general rigidity, and the fixed reception of riser tube 22 by collar 52, restraining arm 58 interferes with removal of the riser tube 22 from the water treatment tank 20. Multiple such restraining arms 58 could be employed extending from different plates 57 extending away from collar 52 at different points, though one restraining arm 58 has been found to be useful enough in tested circumstances. The device 50 is configured such that the angle at which the restraining arm 58 extends away from the central region 54 is adjustable using a nut and bolt tightening combination 60 between the restraining arm 58 and the plate 57. This adjustability enables the device 50 to accommodate various dimensions of water treatment tank 20.

In this embodiment, collar 52 is dimensioned to accommodate a particular diameter of riser tube 22. A collar 52 along with set screw tightening mechanism 56, could accommodate somewhat of a range of diameters of riser tube 22, provided that the riser tube 22 was able to fit within the central region 54 of the collar 52 and the tightening mechanism 56 could sufficiently secure the collar 52 onto the riser tube 22. However, device 50 could be implemented such that particular sizes of collar 52 could be closely matched to particular diameters of riser tube 22.

Figure 3:
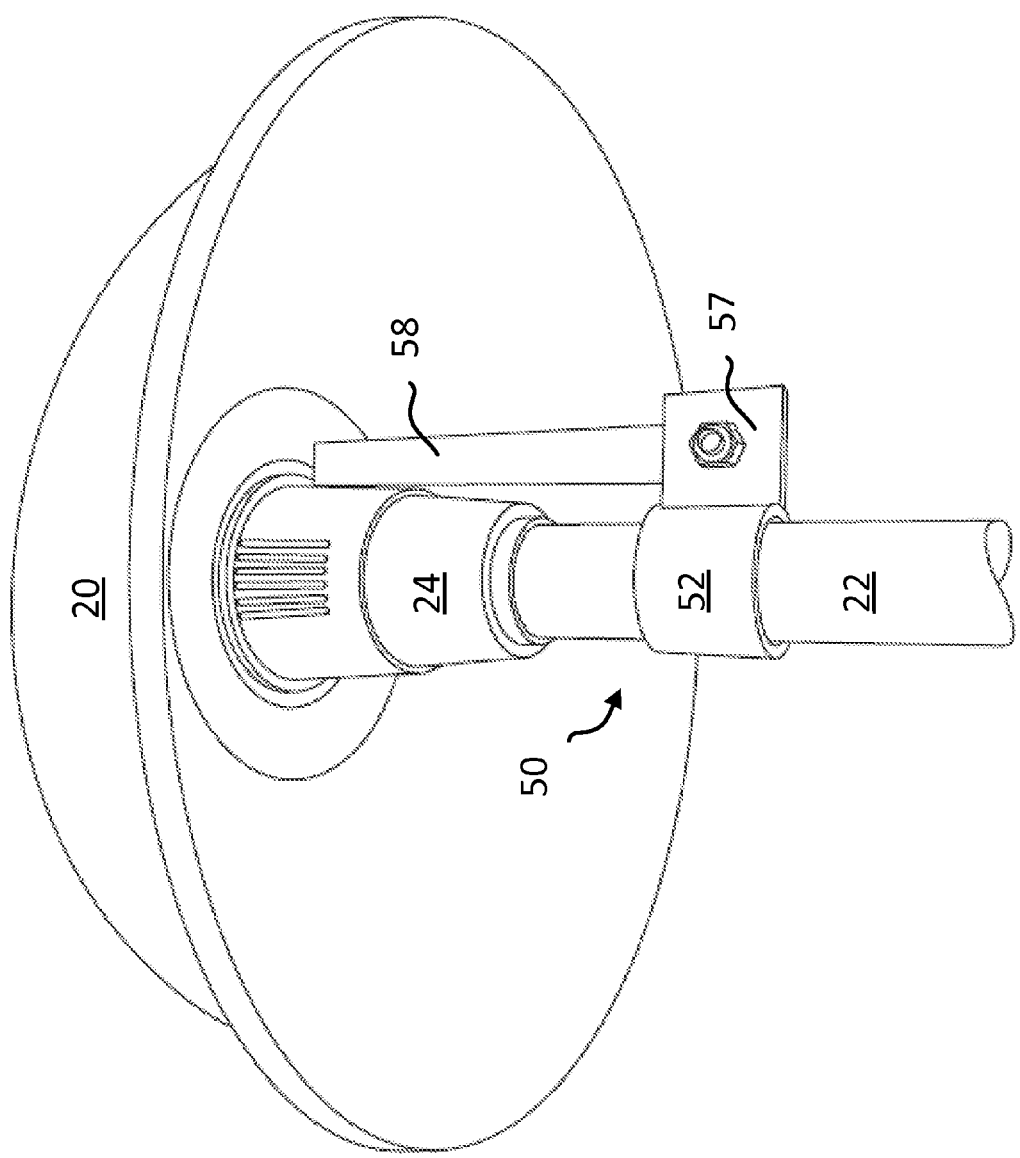
FIG. 3 is perspective front sectional view of a water treatment tank including the device of FIG. 2 having fixedly received a riser tube and having a single arm that extends away from the collar upwards towards the top portion of the inner wall of the water treatment tank.

FIG. 3 is perspective front sectional view of a water treatment tank 20 including the device 50 having fixedly received a riser tube 22 and with its restraining arm 58 extending away from the plate 57 upwards towards the top portion of the inner wall of the water treatment tank 20. It can be seen that arm 58 can also be adjusted to accommodate upper basket 24, should it be required.

Figure 4:
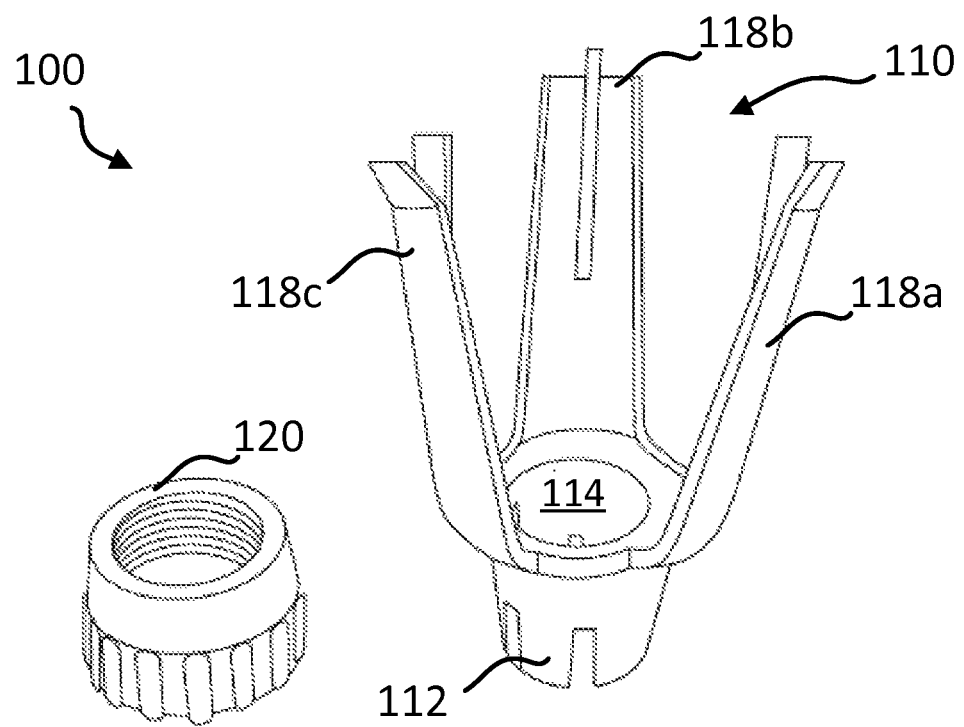
FIG. 4 is perspective front view of a device for interfering with removal of a riser tube, in disassembled form, according to an alternative embodiment.

FIG. 4 is perspective front view of a device 100 for interfering with removal of riser tube 22, according to an alternative embodiment. In this embodiment, device 100 has a first portion 110 and a second portion 120 that cooperate together to enable device 100 to fixedly receive a riser tube 22. In particular, second portion 120 can be slid over top of a riser tube 22 and then a collar 112 of a first portion 110 is slid over the riser tube 22 such that the riser tube 22 is received in its central region 114. The first and second portions 110, 120 are then threaded together. Threading second portion over collar 112 of first portion 110 causes legs of collar 112 to be forced inwards towards central portion 114 and therefore against riser tube 22 so as to tighten device 100 against the riser tube 22.

Device 100 also includes restraining arms 118a, 118b and 118c which are generally rigid and which extend upwards and slightly outwards from collar 112 and that are dimensioned in length to contact an inner wall of the water treatment tank 20 in a similar manner as restraining arm 58 of device 50. Should the riser tube 22 be pulled upwards upon removal of the water treatment valve 30 with respect to the water treatment tank 20, the restraining arms 118a-118c contact the water treatment tank 20 and due to the fixed reception of riser tube 22 by device 100, interferes with removal of the riser tube 22 from the water treatment tank 20.

Figure 5:
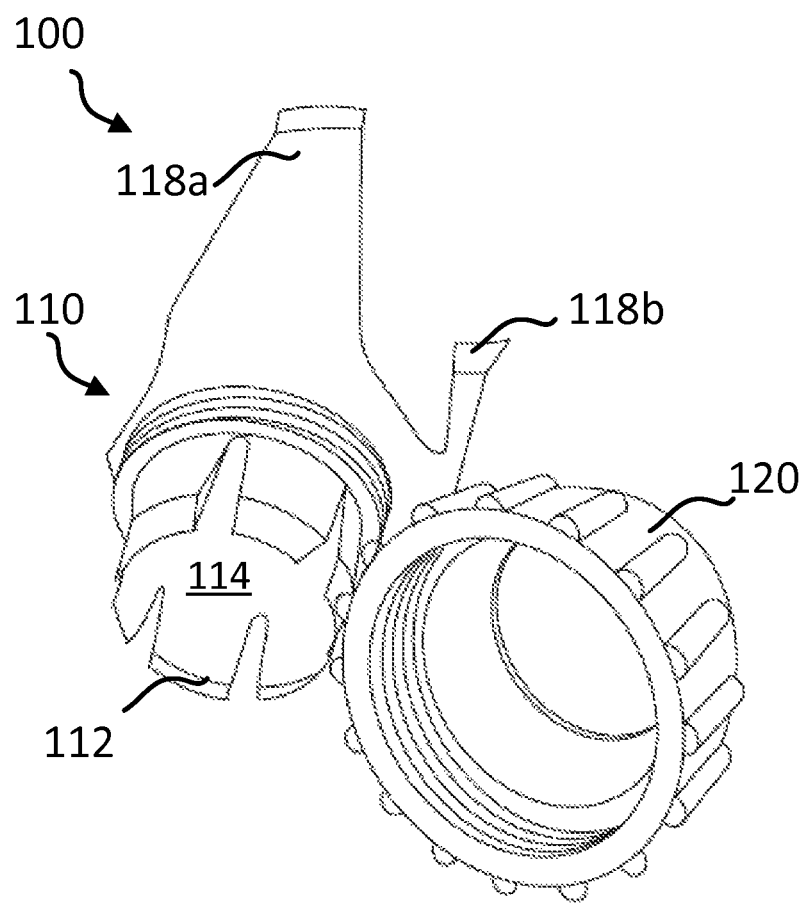
FIG. 5 is a perspective bottom view of the device of FIG. 4 in disassembled form.

FIG. 5 is a perspective bottom view of the device 100 in disassembled form, showing mating threaded areas of the collar 112 of the first portion 110 and of the interior of the second portion 120.

Figure 6:
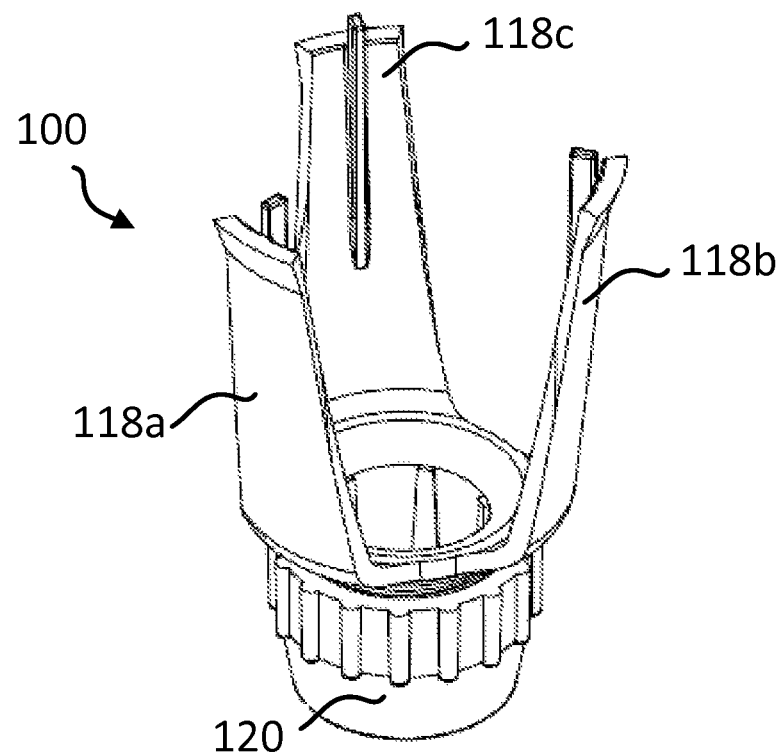
FIG. 6 is a perspective front view of the device of FIG. 4 in assembled form.

FIG. 6 is a perspective front view of the device 100 of FIG. 4 in assembled form, where second portion 120 has at least partially received the legs of collar 112 of first portion 110 in threaded engagement.

Figure 7:
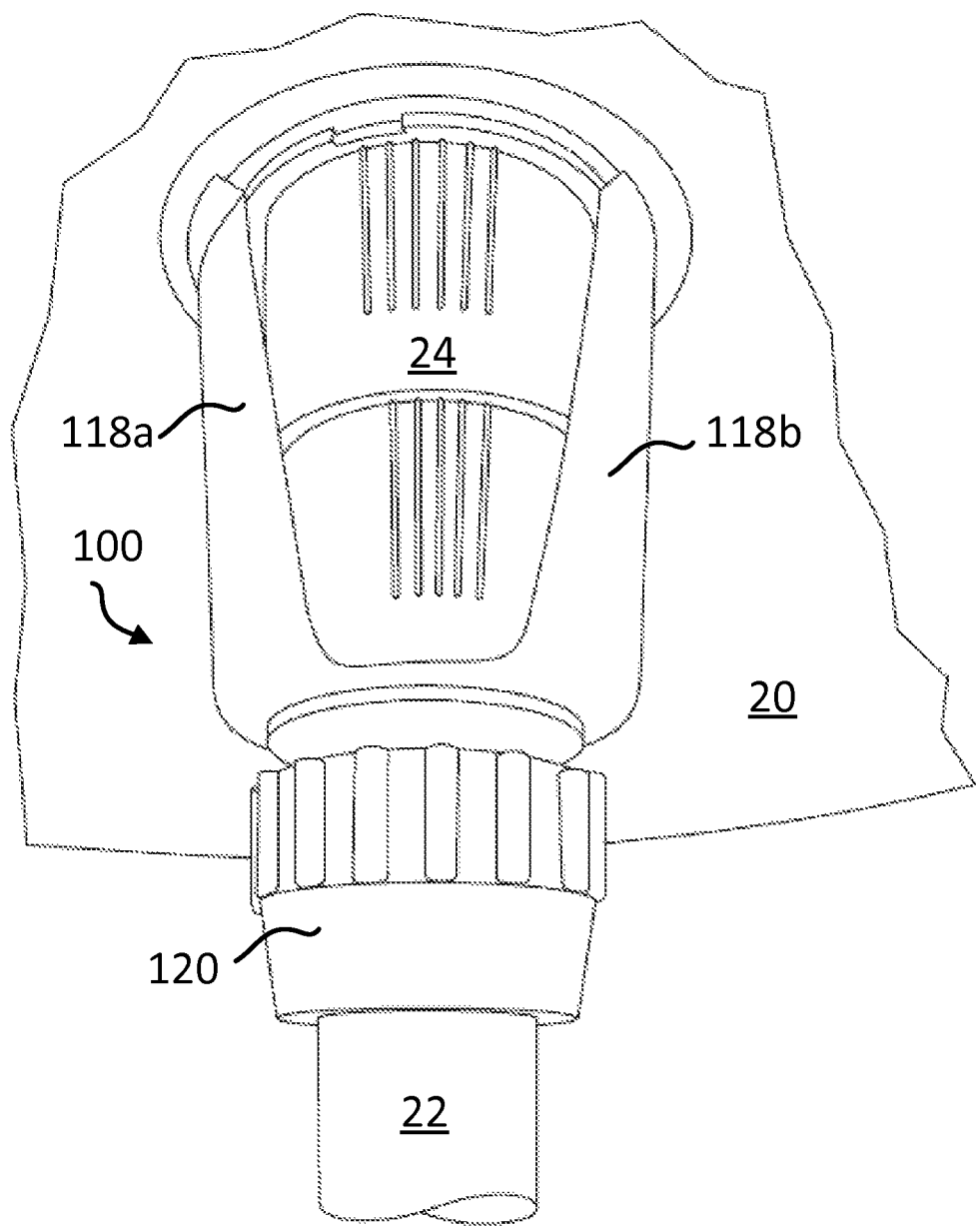
FIG. 7 is a perspective front view of the device of FIG. 4 in assembled form and having fixedly received a riser tube.

FIG. 7 is perspective front sectional view of a water treatment tank 20 including the device 100 having fixedly received a riser tube 22 and with its restraining arms 118a, 118b and 118c extending away from the collar 112 and upwards towards the top portion of the inner wall of the water treatment tank 20. It can be seen that restraining arms 118a-118c all accommodate the dimensions of upper basket 24, so as not to interfere with upper basket 24. It will be noted that restraining arm 118c extends upwards and away from collar 112 behind upper basket 24 and riser tube 22, from the perspective given in FIG. 7.

A device for interfering with removal of a riser tube from within a water treatment tank, such as device 50 or device 100, may be incorporated into various water treatment systems. Such water treatment systems may include water softening systems, iron and other contaminant-removal water treatment systems, or other systems in which interference with removal of a riser tube in the manner described could be useful.

A device for interfering with removal of a riser tube from within a water treatment tank, such as device 50 or device 100, may be made of stainless steel, plastics compatible with potable water systems, or other materials or combination of materials suitable for contact with water being treated.

Although embodiments have been described with reference to the drawings, those of skill in the art will appreciate that variations and modifications may be made without departing from the spirit and scope thereof as defined by the appended claims.

What is claimed is:

1. A system comprising:
 a water treatment tank;
 a riser tube within the water treatment tank; and
 a device for interfering with removal of the riser tube from within the water treatment tank, the device comprising:
  a collar having a central region dimensioned to fixedly receive the riser tube; and
  at least one restraining arm extending from the collar away from the central region,
  wherein the at least one restraining arm is dimensioned to contact an inner wall of the water treatment tank when the riser tube is moved upwards with respect to the water treatment tank thereby interfering with removal of the riser tube from the water treatment tank.

2. The system of claim 1, wherein the collar fixedly receives the riser tube in a friction fit.

3. The system of claim 1, wherein a tightening mechanism is associated with the collar for tightening the collar against the riser tube.

4. The system of claim 3, wherein the tightening mechanism comprises a set screw threaded through the collar.

5. The system of claim 1, wherein the at least one restraining arm extends away from the central region via a respective adjustable connection, each adjustable connection enabling an angle at which the at least one restraining arm extends away from the central region to be selectively adjustable thereby to accommodate use of the device with various dimensions of water treatment tank.

6. The system of any one of claims 1 to 5, wherein the collar is dimensioned to fixedly receive riser tubes of various diameters.

\* \* \* \* \*